United States Patent

[11] 3,587,950

[72] Inventors Richard Woolliscroft Haigh
Shelsley, Beauchamp;
Frederick Vincent Commander, Wollaston,
Stourbridge, England

[21] Appl. No. 809,290

[22] Filed Mar. 21, 1969

[45] Patented June 28, 1971

[73] Assignee U.M. Electrical Distributors Limited
Kent, England

[54] CONTROL DEVICE RESPONSIVE TO A SEQUENTIAL CODE
13 Claims, 3 Drawing Figs.

[52] U.S. Cl. ........ 317/134, 70/278, 307/40

[51] Int. Cl. ........ H01h 47/00

[50] Field of Search ........ 70/278; 317/134

[56] References Cited

UNITED STATES PATENTS

| | | | |
|---|---|---|---|
| 2,197,802 | 4/1940 | James | 70/278 |
| 3,321,673 | 5/1967 | Wolfe | 317/134 |

*Primary Examiner*—Milton O. Hirshfield
*Assistant Examiner*—Ulysses Weldon
*Attorney*—Cushman, Darby & Cushman

ABSTRACT: A control device comprises five gate circuits connected in cascade. The gate circuits are brought into a conducting phase and a nonconducting phase sequentially by sequentially applied external pulses, each gate circuit being brought into the conducting phase by one of the external pulses only if the preceding gate circuit is in the conducting phase. The preceding gate circuit substantially goes into this nonconducting phase. The electrical apparatus is actuated only if the gate circuits are brought into and out of said conducting phase in a predetermined sequence.

PATENTED JUN 28 1971 3,587,950

SHEET 1 OF 3

Figure 1:
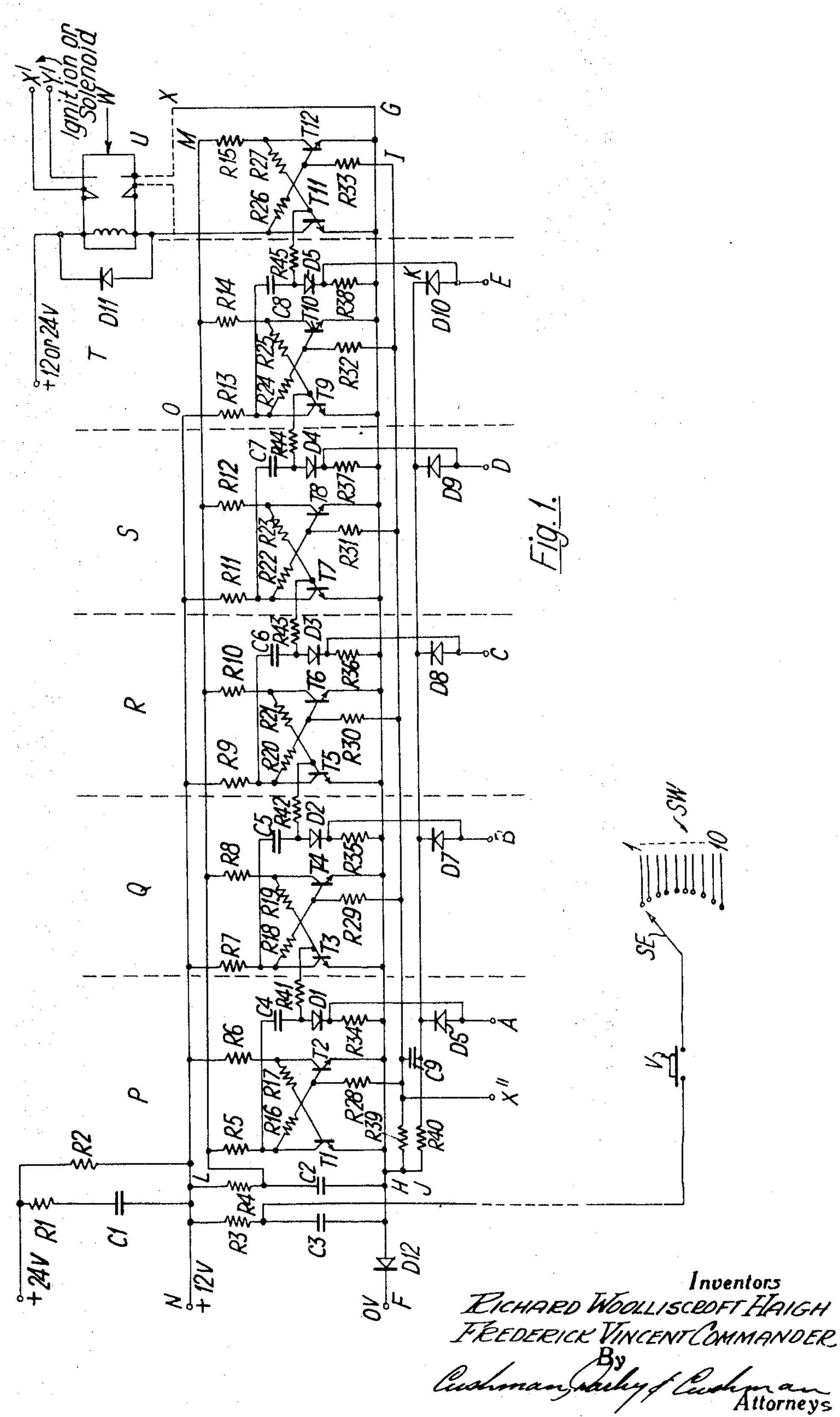

Inventors
RICHARD WOOLLISCROFT HAIGH
FREDERICK VINCENT COMMANDER
By
Cushman, Darby & Cushman
Attorneys Inventors
RICHARD WOOLLISCROFT HAIGH
FREDERICK VINCENT COMMANDER
By
Cushman, Darby & Cushman
Attorneys Inventors
RICHARD WOOLLISCROFT HAIGH
FREDERICK VINCENT COMMANDER
By
Cushman, Darby & Cushman
Attorneys

CONTROL DEVICE RESPONSIVE TO A SEQUENTIAL CODE

The invention relates to control devices and although not so restricted will be described with reference to its use in connection with an antitheft device for a mechanically powered vehicle.

According to the present invention there is provided a control device for activating electrical apparatus comprising a plurality of gate circuits connected in cascade, said gate circuits being brought into a conducting phase or a nonconducting phase sequentially by means of sequentially applied external pulses, each gate circuit being brought into the conducting phase by one of said external pulses, only if the preceding gate circuit is in the conducting phase, the preceeding gate circuit substantially simultaneously going into the nonconducting phase, said electrical apparatus being activated only if said gate circuits are brought into and out of said conducting phase in a predetermined sequence.

Preferably, if the gate circuits are supplied with an external pulse in other than the said predetermined sequence, all the gate circuits are brought into the nonconducting phase.

Preferably an electrical supply is connectable to a first gate circuit, the connection of said electrical supply bringing said first gate circuit into the conducting phase.

According to a preferred embodiment it is necessary to reconnect said electrical supply to said first gate circuit when all the gate circuits are in the nonconducting phase.

A diode may be provided between said electrical supply and said first gate circuit to prevent the application of a supply of reverse polarity to said control device.

Means may be provided to prevent more than one gate circuit being brought into the conducting phase by a single pulse.

In a further preferred embodiment of the invention said electrical apparatus is a relay or a thyristor.

Preferably the gate circuit comprises two semiconductor devices forming a bistable pair. The semiconductor devices may be transistors.

Also according to one application of the present invention there is provided an antitheft device for a mechanically powered vehicle having a selector device for producing said sequential pulses and a control device as described in the preceding paragraphs.

The relay may be connected to an electric circuit of said vehicle in such a manner that when the relay is deactivated by said control device, the vehicle is immobilized.

The vehicle may have an internal combustion engine, said relay being connected to a solenoid actuated valve means which interrupts at least the fuel supply when the relay is deactivated, so immobilizing the vehicle.

A key device may be connected between the selector device and the control device for altering the order of selection of the selector device for producing said sequential pulses.

Figure 2:
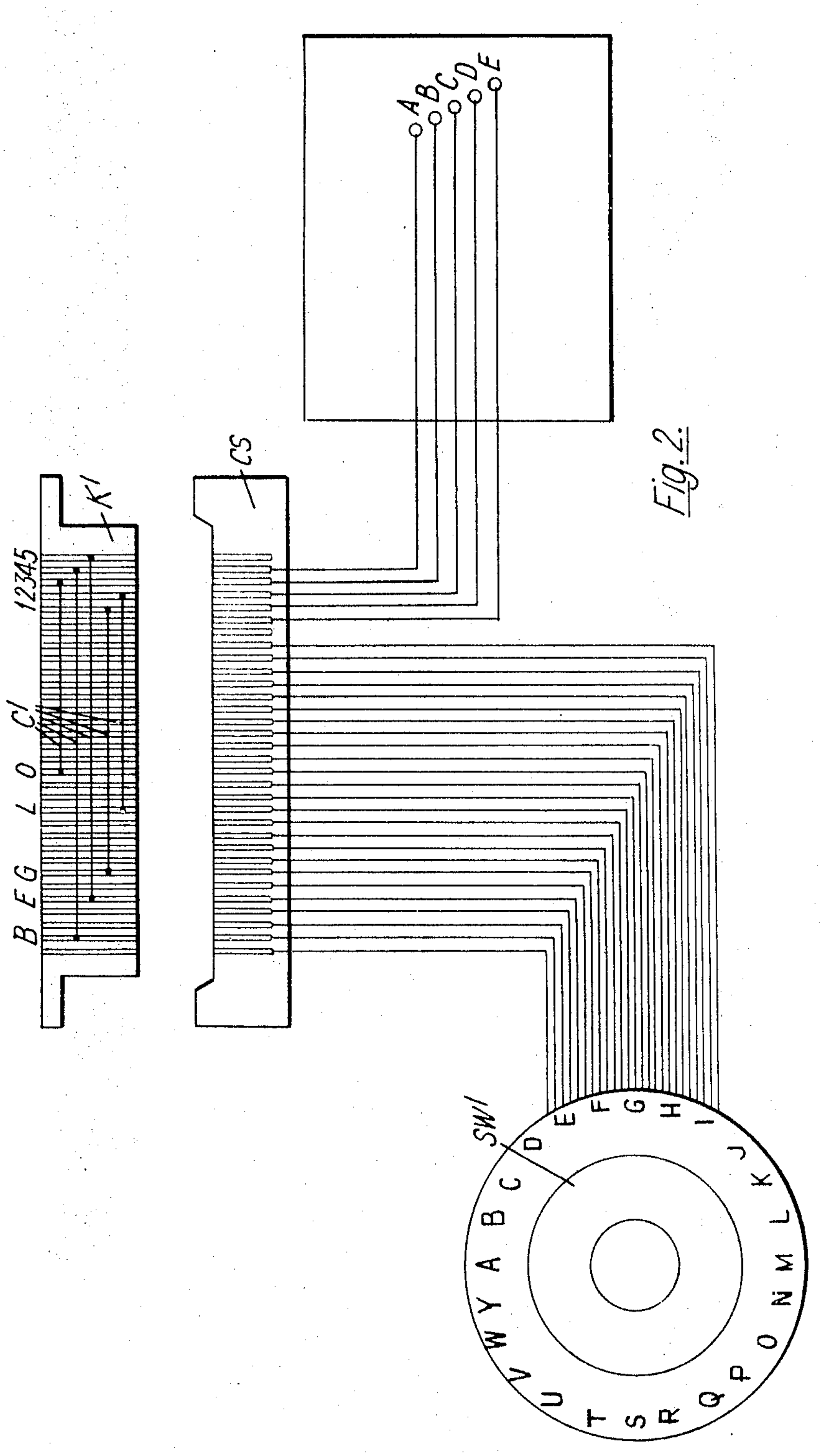
Figure 3:
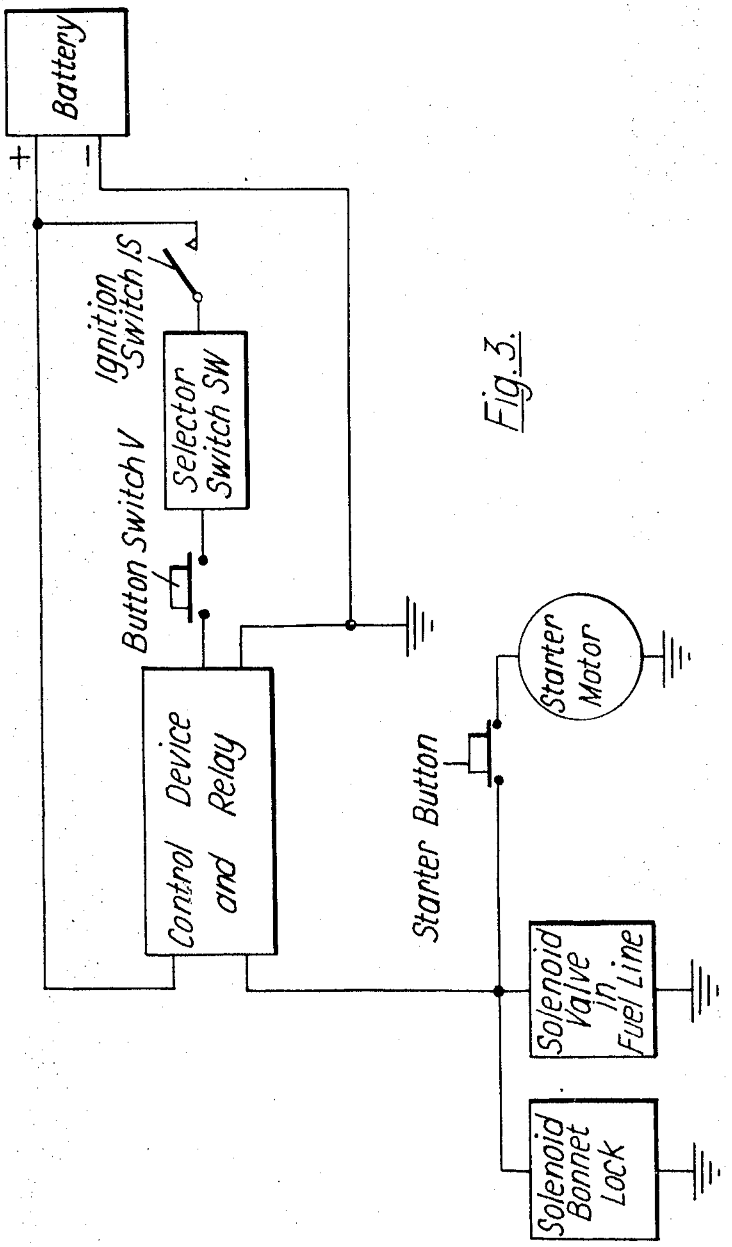

The invention will be described, merely by way of example, in the accompanying drawings, in which:

FIG. 1 is a circuit diagram of a control device according to a practical embodiment of the invention, FIG. 2 shows a device for operating the control device of FIG. 1, and FIG. 3 is a schematic circuit diagram of the control device used as a vehicle antitheft device.

Referring to FIG. 1 the control device comprises six similar stages P, Q, R, S, T, U, each stage being a bistable circuit. The stage P comprises two transistors $T_1$, $T_2$ forming a bistable pair, i.e., only one transistor being able to conduct at a time. The collector of the transistor $T_1$ is connected via a resistor $R_5$ to a secondary supply line LM which is connected to the primary supply line NO via a resistor $R_4$. The collectors of the transistors $T_1$, $T_2$ are connected to the base of transistor $T_2$, $T_1$ by way of resistors $R_{16}$ and $R_{17}$ respectively.

The emitters of transistors $T_1$ and $T_2$ are connected to a primary earth line FG. The base of transistor $T_2$ is connected to a secondary earth line HI by way of resistor $R_{28}$.

The collector of transistor $T_1$ is also connected by way of capacitor $C_4$, diode $D_1$ and resistor $R_{34}$ to primary earth line FG. A connection is taken from between the diode $D_1$ and the resistor $R_{34}$ to input terminal A which connects with a diode $D_6$ to a tertiary earth line JK.

A connection from between the capacitor $C_4$ and the diode $D_1$ is taken via resistor $R_{41}$ to the base of a transistor $T_3$ of the subsequent stage Q. The remaining stages Q, R, S, T, U will not be described in detail as they are substantially the same as the described stage P.

The operation of the device will be described, each bistable pair of transistors being described as being "on" when the left-hand transistor of each pair, i.e., $T_1$, $T_3$, $T_5$, $T_7$, $T_9$ and $T_{11}$, is conducting.

The control device is designed to operate on a supply voltage which is connected across primary supply line NO and primary earth line FG. When the supply is applied to the circuit, stage P comes "on" and the remainder stay "off" since the rise of the collector supply to transistors $T_3$, $T_5$, $T_7$, $T_9$ and $T_{11}$ is delayed. This delay is achieved by connecting resistor $R_4$ and capacitor $C_2$ across the primary supply line NO and primary earth line FG and connecting the collector of transistor $T_1$ via the resistor $R_5$ to between resistor $R_4$ and capacitor $C_2$.

Stages Q, R, S, T, U are switched "on" in turn by applying positive pulses to terminals A, B, C, D, E in sequence, the preceding stage going "off" as the stage is switched "on."

Turning now to this switching "off" and "on" action, consider the case when a positive pulse is applied to the terminal A; this switches stage P "off" and stage Q "on." The positive pulse applied to the terminal A passes through the diode $D_6$ and condenser $C_9$ to resistor $R_{28}$ thus switching stage P to "off." Thus, the collector voltage of $T_1$ rises and this rise is applied through capacitor $C_4$ and resistor $R_{41}$ as a pulse to the base of transistor $T_3$ of stage Q. Since the time constant of the subcircuit of capacitor $C_9$ and resistor $R_{39}$ is much shorter than the subcircuit capacitor $C_4$ and resistor $R_{41}$, the pulse from the collector of the transistor $T_1$ on the base of transistor $T_3$ outlasts that on the base of transistor $T_4$ and thus stage Q is left "on." At this time the diode $D_1$ does not conduct since its cathode is held positive by the positive pulse applied to terminal A.

Consider now the case where the positive pulse was applied to one of the terminals other than A in error, e.g., applied to terminal C. Stage P would still be switched "off" since a pulse would still pass via condenser $C_9$ and resistor $R_{28}$ to the base of transistor $T_2$ although it would have passed through diode $D_8$ rather than $D_6$ had the positive pulse been applied to the correct terminal. However, a positive pulse through terminal C would not switch "on" stage Q because the pulse from transistor $T_1$ which switches stage Q "on" when the positive pulse is applied to terminal A would pass through the diode $D_1$ and resistor $R_{34}$ to the primary earth line FG. Hence stage Q would not be switched "on." Hence all the stages would be "off" and to repeat the sequence it would be necessary to apply the supply to stage P and repeat applying the positive pulses to terminals A, B, C, D, E in sequence.

The transfers between stages Q and R, R and S, S and T, and T and U are similar to those described for stages P and Q.

A pulse to the terminal X″ will switch all the stages P, Q, R, S, T, U to "off" due to the pulse being applied to the bases of transistors $T_2$, $T_4$, $T_6$, $T_8$, $T_{10}$ and $T_{12}$ via resistors $R_{28}$, $R_{29}$, $R_{30}$, $R_{31}$, $R_{32}$ and $R_{33}$.

It will be clear that the application of a double pulse to any of the terminals will switch all the stages "off" since the first pulse will switch that stage "off" and the next "on" and the second pulse will, in effect, be applied in wrong sequence thus switching all the stages to "off" as described above.

A diode $D_{12}$ is placed in the primary earth line FG and protects the transistors from accidental application of an electrical supply of reverse polarity.

The output of the control device is taken from point Y and may be connected to a relay W as shown. Such a relay may be shunted by a diode $D_{11}$, the purpose of which is to protect the transistor $T_{11}$ in stage U from the inductive surge when the relay is switched off. The relay cannot be actuated until the correct sequence of positive pulses has been applied to terminals A, B, C, D, E. The output of the relay is provided through terminals X′ and Y′.

A further terminal X connected to the primary earth line FG may be provided and connected to the relay W to prevent the relay becoming deactivated due to interference during running of the engine with the electrical supply.

To produce the positive pulses one method is shown in FIG. 1 and that is a multiple switch SW having 10 contacts (numbered 1—10) and a button switch V. Five of the contacts 1-—10 are connected to terminals A, B, C, D, E with the unused contacts being connected to the terminal X″. Thus the switch SW and the control device act as a "combination lock," i.e., the correct selection of the contacts has to be made in order to sequentially apply pulses to the terminals A, B, C, D, E, thus to activate the relay W. The switch electrode SE is connected to the electrical supply by way of a button switch V. Thus supposing the terminals A, B, C, D, E are connected to contacts 2, 4, 9, 3 and 1 respectively (contacts 5, 6, 7, 8, 10 being connected to terminal X″), then with the button switch V in the open position the switch electrode would be made to engage contact 2 and the button V depressed thus giving a pulse to terminal A. The button V would be released and the switch electrode made to engage contact 4 and the button again depressed, thus giving a pulse to the terminal B and so on. As stated above, the incorrect selection of the contacts 24931 would result in a failure of the relay to be activated. It will be clear from the foregoing description that any repeat of a digit, e.g., 244931, will cause all the stages to go "off." Thus if the button switch V makes a bad contact or a "double" contact then all the stages could go "off." To alleviate this, resistor $R_3$ and capacitor $C_3$ are provided across the electrical supply to give a comparatively slow buildup of the operating voltage, thus preventing the stages going "off" if the button switch V does not break cleanly. A resistor $R_{40}$ in the tertiary earth line JK is provided and has a comparatively high value to provide slow discharge of capacitor $C_9$, reducing further the sensitivity of the control device to unclean breaking of the pushbutton.

Also to avoid this problem of an unclean break by button switch V, it would be possible to add a monostable circuit as a pulse lengthener.

If it is required to run the system on a different voltage supply, a series resistor $R_2$ may be inserted into the primary supply line NO. This resistor $R_2$ is shunted by a further resistor $R_1$ and $C_1$ in series to provide a rapid production of the necessary supply. Other voltage converting systems could, of course, be employed.

Instead of using a relay connected to the output of the device a thyristor may be used.

Referring to FIG. 2 there is shown a multiple switch SW′ having a key device K′ interposed between the switch SW′ and the control device. The purpose of the key device is to enable the "combination" which must be dialed on the switch SW′ to actuate the relay to be charged without necessitating the dismantling of the switch SW′ and its connecting leads.

The switch SW′ in this particular embodiment is a multiple switch having 25 contacts (lettered A—Y) and a button switch (not shown). Each of the contacts is connected to a multicontact socket CS which, in this case, has 32 sockets. The terminals A, B, C, D, E are connected to five of the sockets of the multicontact socket CS.

Into the multicontact socket CS fits a key K′ which has 32 pins which engage in the 32 sockets. Five of the 25 pins which mate with the sockets corresponding to the contacts A—Y are connected to the five pins 1, 2, 3, 4, 5, which mate with the sockets corresponding to the terminals A, B, C, D, E respectively, by means of connections C′. Thus when the key K′ is inserted into the multicontact socket CS five predetermined contacts on the switch SW′ are connected to the control device via pins 1, 2, 3, 4, 5.

For example consider the combination GLOBE. Within the key K′ the pin corresponding to socket G is connected to pin 1 (which corresponds to terminal A); the pin corresponding to socket L is connected to pin 2 (which corresponds to terminal B) and so on. Thus the dialing of the combination GLOBE will activate the relay.

It is clear that by inserting a differently connected key K′ into the multicontact socket CS the combination may be changed. As shown in FIG. 2 the 25 contacts (A—Y) are connected to the left-hand 25 sockets, there being a spare socket and then the five sockets to which the terminals A, B, C, D, E are connected and a further spare socket. However the contacts (A—Y) and the terminals A, B, C, D, E could be connected to the sockets in any predetermined order or randomly. For additional security when the relay is to be immobilized the key K′ may also be removed; the insertion of a wrongly connected key will, of course, result in it being impossible to actuate the relay.

The unused pins, i.e., those contacts (A—Y) not connected to pins 1, 2, 3, 4, 5 may be connected together (not shown) and to one of the sockets corresponding to one of the spare pins, the corresponding spare socket being connected to the terminal X″. Thus the dialing of the wrong combination results in all the stages of the control device going OFF as described above.

From the foregoing description it is obvious that the contact device could be used as a combination lock to many systems, e.g., doors, safes and other places where security is required. In FIG. 3 there is shown the use of the device in protecting a mechanically powered vehicle from theft. One side of the selector switch SW is connected to the ignition switch IS of the vehicle which may, for example, be a diesel lorry. The other side of the selector switch is connected to the button switch V and to the contact device and relay as described with reference to FIG. 1. One relay contact is connected to the positive terminal of the battery, the other to a solenoid valve in the fuel line. Thus no fuel will be supplied to the engine if the relay is not activated by the control device, i.e., until the correct "combination" has been dialed on the selector switch. As shown in FIG. 3 the control device may also control a solenoid bonnet lock and the starter motor. This will prevent a thief trying to put the control device out of action if it is situated under the bonnet. In a petrol driven car the relay may cut off the electricity supply to the ignition coil, thus causing immobilization of the vehicle. The device may also immobilize an electrically powered vehicle, the relay when deactivated cutting off the electric supply from the batteries to the electric power units.

The control device could also be used to protect the cargo carried in the lorry by adapting it to actuate a solenoid lock connected to the lorry rear doors.

We claim:

1. A control device for activating electrical apparatus comprising;
- a plurality of bistable circuits connected in cascade,
- means for applying sequential external pulses,
- said bistable circuit being brought into an "on" condition or "off" condition sequentially by the sequentially applied external pulses,
- each bistable circuit being brought into the "on" condition by one of said external pulses only if the preceding bistable circuit is in the "on" condition, the preceding bistable circuit substantially simultaneously going into the "off" condition,
- a first one of said bistable circuits adapted for correction across an electrical supply, the connection of said electrical supply bringing said first bistable circuit into the "on" condition,
- said electrical apparatus being activated only if said bistable circuits are brought into and out of said "on" condition in a predetermined sequence,
- said means for applying sequential external pulses including means for turning all of said bistable circuits "off" in response to any external pulse not corresponding to said predetermined sequence, the arrangement being such that if the bistable circuits are supplied with an external pulse in other than the said predetermined sequence all the bistable circuits are brought into the "Off" condition and it is necessary to reconnect said electrical supply to said first bistable circuit when all the bistable circuits are in the "Off" condition.

2. A control device as in claim 1 in which a diode is provided between said electrical supply and said first bistable circuit to prevent the application of a supply of reverse polarity to said control device.

3. A control device as in claim 1 in which means are provided to prevent more than one bistable circuit being brought into the "on" condition by a single pulse.

4. A control device as claimed in claim 1 in which said electrical apparatus is a relay or a thyristor.

5. A control device as in claim 1 in which said bistable circuit comprises two semiconductor devices forming a bistable pair.

6. A control device as claimed in claim 2 in which said semiconductor devices are transistors.

7. An antitheft device for a mechanically powered vehicle to activate an electrical apparatus in response to a predetermined sequence of external pulses, said antitheft device comprising:

a plurality of bistable circuits adapted to turn "on" and "off" in response to electrical pulses, coupling means connected between said circuits thereby connecting said circuits in cascade from a first circuit to a last circuit for turning each succeeding circuit "on" in response to the just preceding circuit being turned "off" provided that an enabling signal is present at the particular coupling means connected between said succeeding and preceding circuits, means for applying said sequential external pulses to said coupling means to sequentially turn said cascade connected bistable circuits "off,"

output means connected to said last bistable circuit for providing an output signal to operate a relay or a thyristor when said last bistable circuit has been turned "on," and starting means for turning said first bistable circuit "on" thereby resetting said device such that subsequent application of said sequential external pulses will result in said last bistable circuit being turned "on" thereby activating said relay or thyristor.

8. An antitheft device as claimed in claim 7 in which said relay is connected to an electric circuit of said vehicle in such a manner that when the relay is deactivated by said control device, the vehicle is immobilized.

9. An antitheft device as claimed in claim 7 in which the vehicle has an internal combustion engine said relay being connected to a solenoid actuated valve means which interrupts at least the fuel supply when the relay is deactivated, so immobilizing the vehicle.

10. An antitheft device as in claim 7 in which a key device is connected between the means for applying sequential external pulses and the control device for altering the order of selection of the selector device for producing said sequential pulses.

11. A control device for activating electrical apparatus in response to a predetermined sequence of external pulses, said device comprising:

a plurality of bistable circuits adapted to turn "on" and "off" in response to electrical pulses, coupling means connected between said circuits thereby connecting said circuits in cascade from a first circuit to a last circuit for turning each succeeding circuit "on" in response to the just preceding circuit being turned "off" provided that an enabling signal is present at the particular coupling means connected between said succeeding and preceding circuits, means for applying said sequential external pulses to said coupling means to sequentially turn said cascade connected bistable circuits "off,"

output means connected to said last bistable circuit for providing an output signal to operate an electrical apparatus when said last bistable circuit has been turned "on," and starting means for turning said first bistable circuit "on" thereby resetting said device such that subsequent application of said sequential external pulses will result in said last bistable circuit being turned "on" thereby activating said electrical apparatus.

12. A device as in claim 11 wherein:

said starting means comprises a connection to an electrical supply thereby preventing resetting of said device without first disconnecting and then reconnecting said electrical supply to said first bistable circuit.

13. A device as in claim 12 wherein:

said means for applying said sequential external pulses includes means for turning all of said bistable circuits "off" in response to any external pulse not corresponding to said predetermined sequence.